(12) United States Patent
Eaton et al.

(10) Patent No.: US 10,061,636 B1
(45) Date of Patent: Aug. 28, 2018

(54) CONVERSION SCHEMES FOR PUBLIC KEY CRYPTOSYSTEMS

(71) Applicant: ISARA Corporation, Waterloo (CA)

(72) Inventors: Edward William Eaton, Waterloo (CA); Atsushi Yamada, Toronto (CA); Kassem Kalach, Waterloo (CA)

(73) Assignee: ISARA Corporation, Waterloo, Ontario (CA)

( * ) Notice: Subject to any disclaimer, the term of this patent is extended or adjusted under 35 U.S.C. 154(b) by 0 days.

(21) Appl. No.: 15/852,816

(22) Filed: Dec. 22, 2017

(51) Int. Cl.
*G06F 11/07* (2006.01)
*H04L 29/06* (2006.01)
*H04L 9/06* (2006.01)

(52) U.S. Cl.
CPC ...... *G06F 11/0784* (2013.01); *G06F 11/0709* (2013.01); *H04L 9/0618* (2013.01); *H04L 63/0428* (2013.01)

(58) Field of Classification Search
CPC ............. G06F 11/0784; G06F 11/0709; H04L 63/0428; H04L 9/0618
See application file for complete search history.

(56) References Cited

U.S. PATENT DOCUMENTS

| | | | | |
|---|---|---|---|---|
| 5,515,307 A * | 5/1996 | Aiello | ................... | H04L 9/0662 380/46 |
| 5,949,884 A | 9/1999 | Adams | | |
| 7,039,192 B1 | 5/2006 | Whelan | | |
| 8,958,553 B2 * | 2/2015 | Tomlinson | .............. | H04L 9/304 380/30 |
| 9,407,437 B1 | 8/2016 | Campagna | | |
| 9,614,668 B1 | 4/2017 | Simmons et al. | | |
| 9,912,479 B1 | 3/2018 | Yamada | | |
| 2003/0081770 A1 * | 5/2003 | Futa | ...................... | H04L 9/3093 380/28 |
| 2003/0165238 A1 * | 9/2003 | Naccache | ............... | H04L 9/302 380/30 |
| 2007/0081668 A1 * | 4/2007 | McGrew | ............... | H04L 9/0637 380/37 |
| 2010/0281336 A1 * | 11/2010 | Seurin | ...................... | H04L 9/06 714/755 |
| 2011/0096923 A1 | 4/2011 | Rollgen | | |
| 2011/0211691 A1 | 9/2011 | Minematsu | | |

(Continued)

FOREIGN PATENT DOCUMENTS

WO    WO 2015056236 A1 *  4/2015  ........... H04L 9/0662

OTHER PUBLICATIONS

Overbeck R., Sendrier N. "Code-based cryptography." In: Bernstein D.J., Buchmann J., Dahmen E. (eds) Post-Quantum Cryptography. Springer, Berlin, Heidelberg, 2009.*

(Continued)

*Primary Examiner* — Darren B Schwartz
(74) *Attorney, Agent, or Firm* — Henry Patent Law Firm PLLC

(57) ABSTRACT

In a general aspect, a conversion scheme is used in a public key cryptosystem. In some aspects, an error vector derivation function is applied to a random value and a message value to produce an error vector. A plaintext value is generated based on the random value, the message value, and the error vector. The error vector and the plaintext value are used in an encryption function to produce a ciphertext component, and the ciphertext component is provided for transmission in a communication system.

26 Claims, 7 Drawing Sheets

(56) References Cited

U.S. PATENT DOCUMENTS

| | | | |
|---|---|---|---|
| 2012/0300925 A1 | 11/2012 | Zaverucha et al. | |
| 2013/0073850 A1* | 3/2013 | Zaverucha | H04L 9/0869 713/168 |
| 2013/0287207 A1* | 10/2013 | Zaverucha | H04L 9/3236 380/44 |
| 2013/0290713 A1 | 10/2013 | Zaverucha et al. | |
| 2014/0019771 A1 | 1/2014 | Emmett et al. | |
| 2014/0105403 A1* | 4/2014 | Baldi | H04L 9/0861 380/282 |
| 2014/0355754 A1 | 12/2014 | Leung et al. | |
| 2015/0163060 A1 | 6/2015 | Tomlinson et al. | |
| 2016/0050067 A1* | 2/2016 | Merchan | H04L 9/0838 713/171 |
| 2016/0080142 A1* | 3/2016 | Isshiki | G06F 21/62 380/28 |
| 2016/0105277 A1* | 4/2016 | Isshiki | G06F 21/62 380/28 |
| 2016/0112189 A1 | 4/2016 | Tomaru | |
| 2016/0330023 A1 | 11/2016 | Tanamoto et al. | |
| 2017/0048058 A1* | 2/2017 | Ren | H04L 9/30 |
| 2017/0104590 A1* | 4/2017 | Wang | H03M 13/05 |
| 2017/0244564 A1* | 8/2017 | Naslund | H04L 9/3242 |
| 2017/0324554 A1* | 11/2017 | Tomlinson | H04L 9/0861 |

OTHER PUBLICATIONS

Rastaghi, Roohallah."An Efficient CCA2-Secure Variant of the McEliece Cryptosystem in the Standard Model", Cryptology ePrint Archive, Report 2013/040, 2013.*

Loidreau, Pierre. "Strengthening McEliece Cryptosystem." In: Okamoto T. (eds) Advances in Cryptology—ASIACRYPT 2000. ASIACRYPT 2000. Lecture Notes in Computer Science, vol. 1976. Springer, Berlin, Heidelberg.*

Dottling, Nico et al. "A CCA2 Secure Variant of the McEliece Cryptosystem." IEEE Transactions on Information Theory, Oct. 2012, vol. 58, No. 10.*

Wang, Yongge. "Revised Quantum Resistant Public Key Encryption Scheme RLCE and IND-CCA2 Security for McEliece Schemes." Apr. 6, 2017, Dept of SIS, UNC Charlotte.*

"Fujisaki et al., Secure Integration of Asymmetric and Symmetric Encyption Schemes, 1999, 18 pages".

"Jonsson et al., RFC 3447, Network Working Group, Public-Key Cryptography Standards (PKCS) #1: RSA Cryptography Specifications Version 2.1, 2003, 68 pages."

"McEliece, A Public-Key Cryptosystem Based on Algebraic Coding Theory, DSN Progress Report, 1978, 3 pages".

"Pointcheval, Chosen-Ciphertext Security for any One-Way Cryptosystem, 2000, 17 pages".

"RSA Laboratories, PKCS #1 v2.2: RSA Cryptography Standard, 2012, 63 pages".

"Wikipedia, Niederreiter Cryptosystem, 2016, 3 pages".

Alkim, Erdem , et al., "Post-quantum key exchange—a new hope", Cryptology ePrint Archive: Report 2015/1092, Dec. 7, 2015, 34 pages.

Baldi, Marco , et al., "Quasi-Cyclic Low-Density Parity-Check Codes in the McEliece Cryptosystem", IEEE 2007; pp. 951-956, 6 pages.

Barreto , et al., CAKE: Code-based Algorithm for Key Encapsulation, Aug. 2017, 21 pgs.

Bernstein, Daniel , et al., "McBits: fast constant-time code-based cryptography", Jun. 21, 2015, 27 pages.

Bernstein, Daniel , et al., "NTRU Prime", May 11, 2016, 34 pages.

Bernstein, Daniel , et al., "Post-Quantum Cryptography", Springer; ISBN: 978-3-540-88701-0, 2009, 248 pages.

Cramer , Design and Analysis of Practical Public-Key Encryption Schemes Secure against Adaptive Chosen Ciphertext Attack, Shoup, 2003,, Aug. 14, 2003, 69 pgs.

Dent, Alexander , "A Designer's Guide to KEMs", Cryptology ePrint Archive: Report 2002/174, Oct. 31, 2005, 28 pages.

Galbraith, Steven , "On the Security of Supersingular Isogeny Cryptosystems", Cryptology ePrint Archive: Report 2016/859, Jan. 31, 2017, 22 pages.

Guo, Qian , "A Key Recovery Attack on MDPC with CCA Security Using Decoding Errors", Cryptology ePrint Archive: Report 2016/858, Sep. 8, 2016, 29 pages.

Howgrave-Graham, Nick , et al., "The Impact of Decryption Failures on the Security of NTRU Encryption", Advances in Cryptology—CRYPTO 2003, Aug. 2003, 28 pgs.

Kobara, Kazukuni , et al., "Semantically Secure McEliece Public-Key Cryptosystems: Conversions for McEliece PKC", K. Kim (Ed.): PKC 2001, LNCS 1992, pp. 19-35, Springer, 2001.

Misoczki, Rafael , et al., "MDPC-McEliece: New McEliece Variants from Moderate Density Parity-Check Codes", Cryptology ePrint Archive: Report 2012/409, May 30, 2013, 22 pages.

Repka, Marek , et al., "Overview of the McEliece Cryptosystem and its Security", Tatra Mt. Math Publ 60, pp. 57-83, 2014, 27 pages.

Wikipedia , "Fisher-Yates shuffle", accessed at https://en.wikipedia.org/wiki/Fisher%E2%80%93Yates_shuffle on May 12, 2017, 2017, 9 pages.

Wikipedia , "S/MIME", accessed at https://en.wikipedia.org/wiki/S/MIME on May 12, 2017, 2017, 3 pages.

* cited by examiner

CONVERSION SCHEMES FOR PUBLIC KEY CRYPTOSYSTEMS

BACKGROUND

The following description relates to conversion schemes for public key cryptosystems.

Cryptography systems ("cryptosystems") are used to communicate securely over public channels. For example, cryptosystems may provide confidentiality by encrypting messages sent over the public channels. Public key encryption algorithms may utilize public and private cryptographic keys to encrypt and decrypt messages. Some public key cryptosystems may be vulnerable to attacks by an adversary, such as an adversary with access to quantum computational resources.

DETAILED DESCRIPTION

Figure 1:
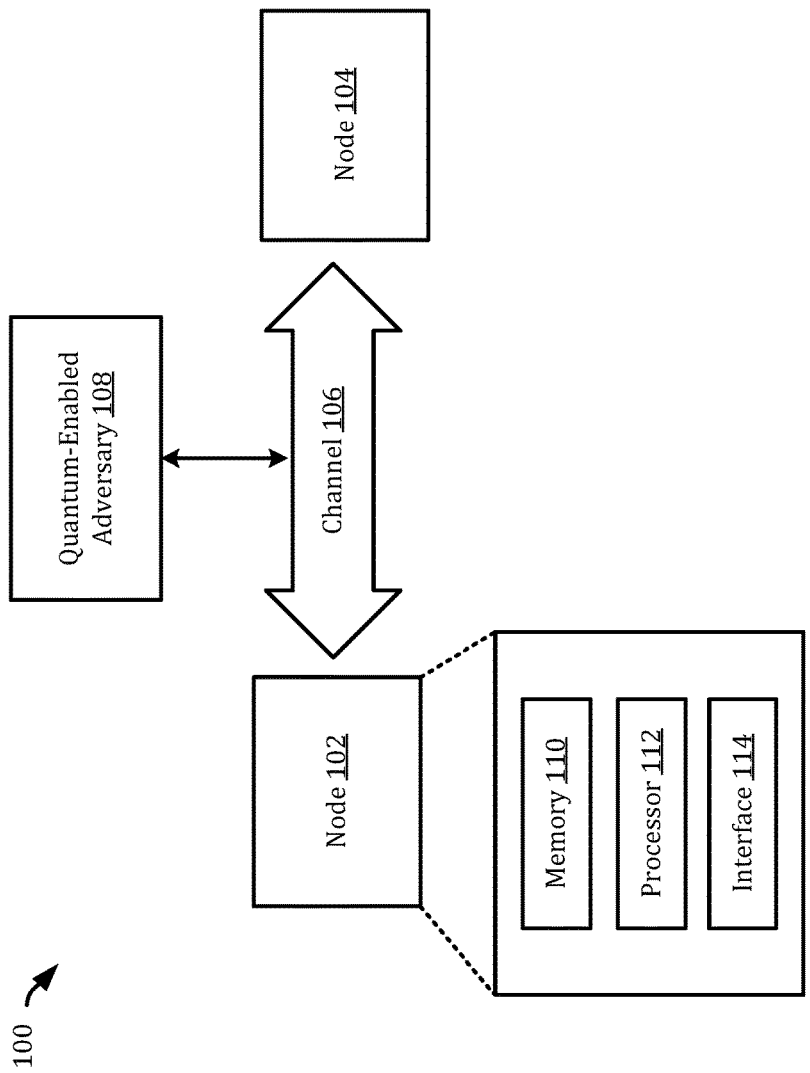
FIG. 1 is a block diagram showing aspects of an example communication system.

In aspects of what is described here, a conversion scheme is incorporated into a public key cryptosystem to encrypt communications. For instance, in some examples, a conversion scheme is used with a public key cryptosystem to encrypt electronic mail communications, such as, for example messages formatted according to the Secure/Multipurpose Internet Mail Extensions (S/MIME) standard, in one pass. The public key cryptosystem may be one based on error correction codes, such as, for example, the McEliece cryptosystem implemented using a Quasi-Cyclic Medium Density Parity Check (QC-MDPC) code, a Niderreiter cryptosystem, or another type of public key cryptosystem. By incorporating a conversion scheme into public key cryptosystems, the communications may be secure against certain types of attacks, such as the Adaptive Chosen Ciphertext Attack (CCA2) and the key recovery attack.

In some aspects, a sender of a message msg may generate a random value s and combine (e.g., concatenate) the message and random value. An error vector derivation function may then be applied to the combination of the message msg and the random value s to produce an error vector e. The error vector derivation function may include, in some instances, the application of a one-way pseudorandom function and a Fisher-Yates shuffle to produce the error vector e. A pseudorandom function may then be applied to the error vector e, and an exclusive-or (XOR) function may be applied to the output of the pseudorandom function and the combination of the message and random value to produce a masked stringy. At least a portion of the masked stringy may then be used as an input to an encryption function (e.g., a McEliece encryption function) along with the error vector e, and the encryption function may produce a first ciphertext component $C_1$, which is sent to a recipient. In some implementations, a portion of the stringy may be used as a second ciphertext component $C_2$, which is also sent to the recipient.

After receipt of the first ciphertext component $C_1$, the recipient may apply a decryption function (e.g., a McEliece decryption function) to the first ciphertext component to produce a first and second decryption function outputs, x and e. A pseudorandom function is applied to the second decryption function output e, and an exclusive-or (XOR) function is applied to the pseudorandom function output and the first decryption function output x. Where a second ciphertext component $C_2$ is used, the first decryption function output x and second ciphertext component $C_2$ are combined (e.g., concatenated) and the combination is used as an input to the exclusive-or (XOR) function instead of just the first decryption function output x. An error vector derivation function is then applied to the output of the exclusive-or function to produce an error vector check value e'. If the error vector check value e' matches the error vector e, then a message is derived from the output of the exclusive-or function and provided to the recipient. In some instances, the output of the exclusive-or function includes the message value (e.g., the message is the k most significant bits of the exclusive-or function output). If the error vector check value e' does not match the error vector e, then a failure is returned.

In some aspects, a sender of a message msg may combine (e.g., concatenate) the message and a constant value const. The sender may also generate a random value s and apply a pseudorandom function to the random value. An exclusive-or (XOR) function can then be applied to the combined message/constant value and the output of the pseudorandom function to produce a first string. A cryptographic hash function may be applied to the first string y1, and an exclusive-or (XOR) function may be applied to the output of the cryptographic hash function and the random value s to produce a second string y2. The first and second strings may be combined (e.g., concatenated), with a plaintext value x being generated therefrom. An error vector derivation function may be applied to the plaintext value x to produce an error vector e. The error vector derivation function may include, in some instances, the application of a one-way pseudorandom function and a Fisher-Yates shuffle to produce the error vector e. The plaintext value x and the error vector e may then be used as inputs to an encryption function (e.g., a McEliece encryption function), and the encryption function may produce a first ciphertext component $C_1$, which is sent to a recipient. In some implementations, a portion of the combined first and second strings may be used as a second ciphertext component $C_2$, which is also sent to the recipient.

After receipt of the first ciphertext component $C_1$, the recipient may apply a decryption function (e.g., a McEliece decryption function) to the first ciphertext component to produce first and second decryption function outputs, x and e. Where a second ciphertext component $C_2$ is used, the first decryption function output x and second ciphertext component $C_2$ are combined (e.g., concatenated) and the combination is used to generate the first and second strings, y1 and y2. A cryptographic hash function may be applied to the first string y1, and an exclusive-or (XOR) function may be applied to the output of the cryptographic hash function and the second string y2 to produce the random value s. A pseudorandom function may be applied to the random value s, and an exclusive-or (XOR) function may be applied to the output of the pseudorandom function and the first string y1 to produce a value containing the message msg and a constant check value const'. An error vector derivation function may be applied to the first decryption function output x to produce an error vector check value e'. If the error vector check value e' matches the error vector e, and the constant check value const' matches the constant value const used to generate the first ciphertext component $C_1$, then the message msg is provided to the recipient. If the error vector check value e' does not match the error vector e or the constant check value const' doesn't match the constant value const, then a failure is returned.

Aspects of the present disclosure may provide one or more advantages in some instances. For example, some aspects may provide communications (e.g., electronic mail communications formatted according to the Secure/Multi-purpose Internet Mail Extensions (S/MIME) standard) over a public channel that are secure against adversaries equipped with classical or quantum computational resources. The communications may be secured, in some aspects, using a one pass protocol using a static key pair. In some instances, the public key used to secure the communications may be small compared to other public key cryptosystem implementations (e.g., the McEliece cryptosystem implemented using a Goppa code). For instance, in some implementations, the public key may be approximately 4 kilobytes (kB) whereas the public key in a McBits implementation may be approximately 1 Megabytes (MB). In addition, in some aspects, a key pair for the public key cryptosystem may be used repeatedly without jeopardizing security. Some aspects may provide secure communications that are resistant to key recovery attacks, the Adaptive Chosen Ciphertext Attack (CCA2), or both.

Further, some aspects may perform a CCA2 conversion technique that is more computationally efficient than other CCA2 conversion techniques, such as, for example, the Kobara-Imai CCA2 conversion. The communications may thus be encrypted, in some cases, using less computational resources than typical public key cryptosystem implementations (e.g., the McEliece cryptosystem implemented with a Kobara-Imai CCA2 conversion, which can take up to approximately 80% of the overall time needed for encrypting messages). For example, in some instances, the error vector derivation function is faster than the error-vector-to-integer function used in the Kobara-Imai CCA2 conversion. Further, the use of a one-way error vector derivation function as described herein may also allow for verification that the error vector is generated in a pseudorandom manner. In some instances, some aspects may allow for the implementations of side channel attack mitigation schemes more easily than other CCA2 conversion techniques. Aspects of the present disclosure may provide other advantages as well.

FIG. 1 is a block diagram showing aspects of an example communication system 100. The example communication system 100 shown in FIG. 1 includes two nodes 102, 104. The nodes use a cryptographic scheme to communicate with each other over a channel 106. In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or both of FIGS. 2-7.

Instructions (e.g., computer code, a computer program, etc.) associated with an operating system, computer applications, or other resources may be stored in the memory 110. In addition, the memory 110 can also store application data and data objects that can be interpreted by one or more applications or virtual machines running on the node 102. The node 102 can be preprogrammed, or it can be programmed (and reprogrammed), by loading a program from another source (e.g., from a removable memory device, from a remote server, from a data network, or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in FIGS. 2-7, as described further below.

In the example node 102 shown in FIG. 1, the processor 112 is a data processing apparatus that can execute instructions, for example, to generate output data based on data inputs. For example, the processor 112 can run computer programs by executing or interpreting the software, scripts, programs, functions, executables, or other modules stored in the memory 110. In some instances, the processor 112 may perform one or more of the operations shown in FIGS. 2-7, as described further below.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using various wireless protocols or standards. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubits encodings. In some implementations, the quantum-enabled adversary 108 can operate in a fault-tolerant regime, or the quantum-enabled adversary may operate below the fault-tolerant regime.

Many public-key cryptosystems are known to be insecure against an attacker armed with a scalable quantum computer. The threat of quantum computers to public key cryptography can be mitigated by switching to other public key cryptosystems that are believed to be invulnerable to quantum attack. For example, certain code-based signature schemes (e.g., the McEliece and Niederreiter cryptosystems) have been proposed as quantum-resistant replacements for certain RSA-based or ECC-based cryptosystems that are believed to be quantum-vulnerable.

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptosystems (e.g., by computing a private key of a certificate authority or other entity based on public information).

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptosystems. For example, the quantum-enabled adversary 108 may be capable of computing prime factors fast enough to compromise certain RSA-based cryptosystems or computing discrete logarithms fast enough to compromise certain ECC-based cryptosystems.

In the example shown in FIG. 1, the nodes 102, 104 may use a quantum-resistant cryptosystem that cannot be compromised by the example quantum-enabled adversary 108. For instance, the nodes 102, 104 may communicate using a cryptosystem that is secure against a quantum computer that can efficiently execute Shor's algorithm or other types of algorithms that are known to compromise the security of certain conventional cryptography standards. In some implementations, for example, the nodes 102, 104 communicate using a McEliece cryptosystem implemented using a Quasi-Cyclic Medium Density Parity Check (QC-MDPC) code, a Niederreiter cryptosystem, or another type of public key cryptosystem. The nodes 102, 104 may implement a CCA2 conversion technique to provide additional security against certain known attacks by adversaries. For example, in some implementations, a CCA2 conversion technique as described herein can be used with the McEliece cryptosystem implemented using a QC-MDPC code to provide security against key recovery attacks and the Adaptive Chosen Ciphertext Attack (CCA2). In some implementations, the nodes 102, 104 execute secure communication over the channel 106 using the example techniques provided in FIGS. 2-7 or using other techniques.

Figure 2:
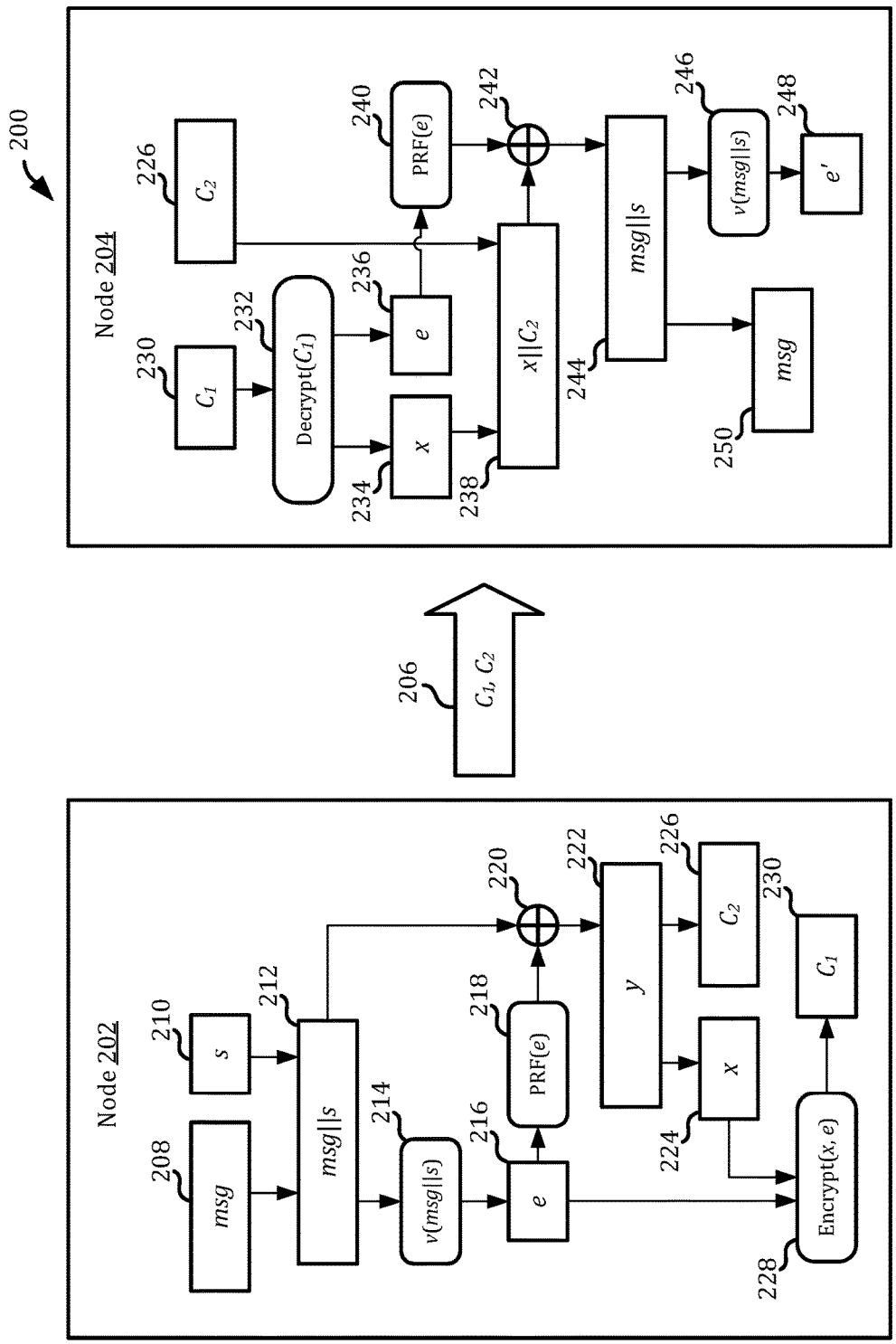
FIG. 2 is a block diagram showing aspects of an example conversion scheme for a public key cryptosystem.

FIG. 2 is a block diagram showing aspects of an example conversion scheme. In the example shown, a communication system 200 includes nodes 202 and 204 communicating over a channel 206. The nodes 202, 204 may be implemented similar to the nodes 102, 104 of FIG. 1. For instance, the nodes 202, 204 may each have computational resources (e.g., hardware, software, firmware) that are used to communicate with other nodes in the communication system 200, and may include a memory, processor, and interface as described above with respect to node 102 of FIG. 1. The nodes 202, 204 can be implemented in various systems, such as, for example, laptops, desktops, workstations, smartphones, tablets, personal digital assistants, servers, server clusters, mainframes, and other types of computer systems.

In the example shown in FIG. 2, the nodes 202, 204 exchange encrypted communications over the channel 206. The encrypted communications may be secure, in some instances, against both classical- and quantum-enabled adversaries (e.g., the quantum adversary 108 of FIG. 1). For instance, in some implementations, the node 202 uses a conversion scheme in a McEliece cryptosystem implemented using a Quasi-Cyclic Medium Density Parity Check (QC-MDPC) code $C$ of (n, k, t), where n is the size of a code word, k is the size of a QC-MDPC plaintext, and t is the Hamming weight of an error vector. By using a conversion scheme, such as the one shown in FIG. 2, the communications exchanged over the channel 206 may be secure against the known key recovery attack as well as the Adaptive Chosen Ciphertext Attack (CCA2) more efficiently than other CCA2 conversion techniques (e.g., the Kobara-Imai CCA2 conversion technique).

In the example shown in FIG. 2, the node 202 obtains a message 208 (msg) and a random value 210 (s). The message 208 may be generated by the node 202 (e.g., by a user of the node 202 using a messaging application), may be obtained from another node in the communication system 200, or may be obtained in another manner. The random value 210 may be generated using a random number generator, or in another manner. In the example shown, the random value 210 has a length of h-bits and the message 208 has a length of l-bits (with l≥k−h, where k denotes the length of a plaintext value (described below)). The node 202 then applies an error vector derivation function 214 (v(•)) to a string 212 (msg∥s) formed by the concatenation of the message 208 and the random value 210 to produce an error vector 216 (e). In the example shown, the error vector derivation function 214 is a one-way (non-invertible) function that generates the error vector 216 in a pseudorandom manner. The error vector 216 has a length of n-bits. In some instances, the error vector derivation function 214 may apply a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the random value and apply a filter (e.g., a Fisher-Yates shuffle) to the pseudorandom function output to produce a set of t integers $(a_1, a_2, \ldots, a_n)$, where each integer is in the range $1 \leq a_i \leq n$ for $a_i \neq a_j$ for $i \neq j$. The set of t integers can then be used to generate the error vector. For example, the error vector may have a Hamming weight equal to t, where the $a_i$-th element of the error vector is set to one (1) and the other elements of the error vector are set to zero (0).

The node 202 then applies a pseudorandom function 218 to the error vector 216 (e). The pseudorandom function 218 may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), a stream cipher (e.g., a Salsa20 or ChaCha function), or another type of pseudorandom function. The node 202 then applies an exclusive-or (XOR) function 220 to the output of the pseudorandom function 218 and the string 212 to produce a masked string 222 (y). In the example shown, the masked string 222 (y) has a length of (l+h) bits, and includes a k-bit plaintext value 224 (x) and an h-bit second ciphertext component 226 ($C_2$). In the example shown, the plaintext value 224 (x) is the k most significant bits of the masked string 222 (y), and the second ciphertext component 226 ($C_2$) is the remaining portion of the masked string 222 (y). In some instances (e.g., where the message 208 is of length k), the masked string 222 (y) does not include a second ciphertext component 226 ($C_2$).

The plaintext value 224 (x) is then used as an input to an encryption function 228 along with the error vector 216 (e) to produce a first ciphertext component 230 ($C_1$). In the example shown, the first ciphertext component 230 has a length of n-bits. In some implementations, the encryption function 228 is a McEliece encryption function implemented according to a McEliece cryptosystem using the QC-MDPC code. For instance, the QC-MDPC code may generate a public key G and private key H, where G is a k x n code generator matrix and H is a (n−k)×n parity check matrix for G. In some implementations, the private key matrix H may be computed first, and the public key matrix G may be derived from H. The encryption function 228 may use the public key matrix G to generate the first ciphertext component 230, for example, according to the equation $C_1 = xG + e$, where $C_1$ is the first ciphertext component 230, x is the plaintext 224, G is the public key matrix for the McEliece cryptosystem, and e is the error vector 216. The node 202 then transmits the first ciphertext component 230 and the second ciphertext component 226 to the node 204 over the channel 206.

In the example shown in FIG. 2, after receiving the first ciphertext component 230 and the second ciphertext component 226, the node 204 applies a decryption function 232 to the first ciphertext component 230. The decryption function 232 may be the inverse of the encryption function 228. In some implementations, the decryption function 232 is a McEliece decryption function implemented according to a McEliece cryptosystem using the QC-MDPC code. For instance, the private key matrix H discussed above may be used to decrypt the first ciphertext component 230, for example, by applying a QC-MDPC decoding algorithm equipped with knowledge of H. The decryption function 232 produces a first decryption function output 234 (x) with a length of k-bits and a second decryption function output 236 (e) with a length of n-bits. The node 204 then applies a pseudorandom function 240 to the second decryption function output 236, and applies an exclusive-or (XOR) function 242 to the output of the pseudorandom function 240 and a string 238 formed by the concatenation of the first decryption function output 234 and the second ciphertext component 226. The exclusive-or function 242 produces a check string 244 (msg∥s) with a length of (k+h)-bits. The pseudorandom function 240 may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), a stream cipher (e.g., a Salsa20 or ChaCha function), or another type of pseudorandom function.

The node 204 then applies an error vector derivation function 246 (v(•)) to the check string 244 of the exclusive-or function 242 to produce an error vector check value 248 (e'). In the example shown, the error vector derivation function 236 is the same as error vector derivation function 214. The node 204 compares the error vector check value 248 with the second decryption function output 236. If the error vector check value 248 is equal to the second decryption function output 236 (if e=e'), the node 204 outputs the message 250 (msg). In the example shown, the message 250 is the k most significant bits of the exclusive-or function check string 244. If, however, the error vector check value 248 is not equal to the second decryption function output 236 (if e≠e'), the node 204 returns a failure. In some implementations, returning a failure includes delivering an error message, a return code, a flag, or another type of indicator. The indicator may be sent back to the node 202, or to another node in a communication system. In some implementations, however, no indicator is sent and the indicator is kept only with the node 204.

Figure 3:
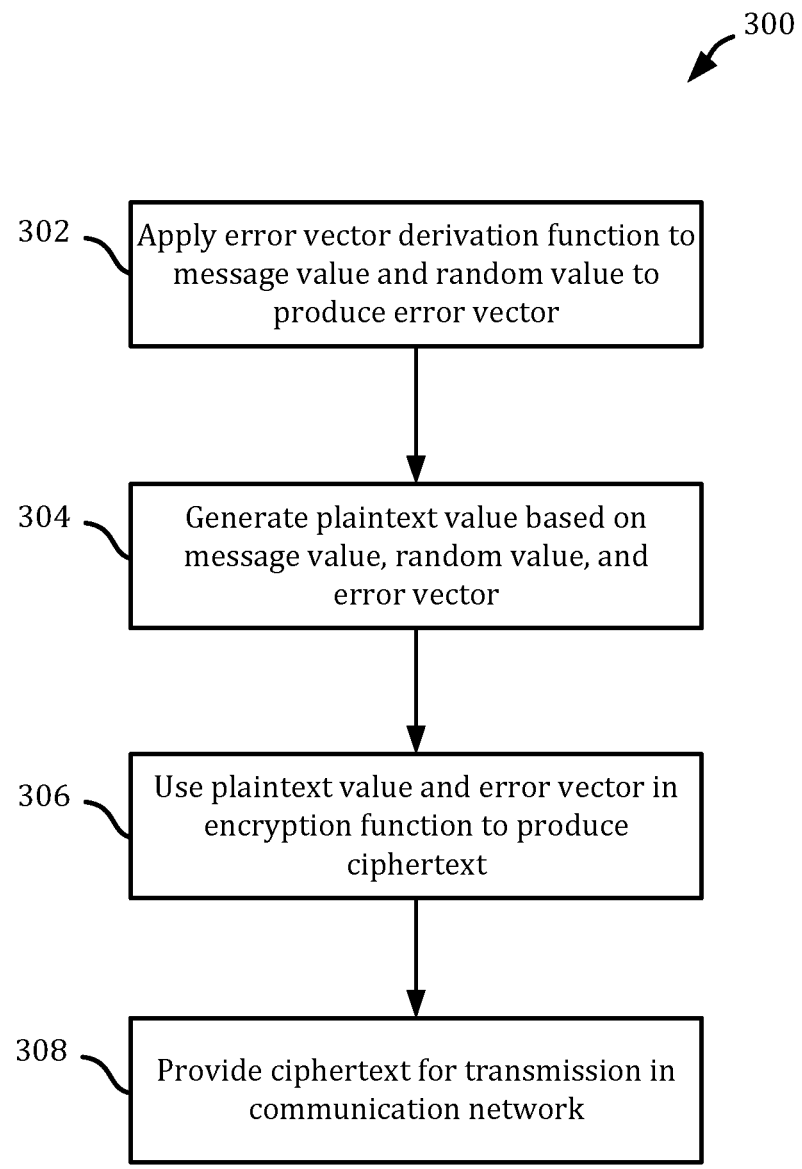
FIG. 3 is a flow diagram showing an example ciphertext generation process.

FIG. 3 is a flow diagram showing an example ciphertext generation process 300. The example process 300 can be performed, for example, by computer systems that can exchange information over a communication channel. For instance, operations in the process 300 may be performed by the nodes 102, 104 in the example communication system 100 shown in FIG. 1, the nodes 202, 204 in the example communication system 200 shown in FIG. 2 or in another type of system. The example process 300 may include additional or different operations, and the operations may be performed in the order shown or in another order. In some cases, one or more of the operations shown in FIG. 3 are implemented as processes that include multiple operations, sub-processes or other types of routines. In some cases, operations can be combined, performed in parallel, iterated or otherwise repeated or performed in another manner. In some examples, the process 300 is secure against quantum-enabled adversaries such as, for example, the quantum-enabled adversary 108 shown in FIG. 1. The example process 300 may also provide security against classically-enabled adversaries who do not have access to quantum computers or other quantum resources.

At 302, an error vector derivation function is applied to a message value msg and a random value s to produce an error vector e. In some implementations, the error vector derivation function is applied to a combination of the message value msg and the random value s. For example, the error vector derivation function may be applied to a concatenation of the message value msg and the random value s as in the example shown in FIG. 2. As another example, the error vector derivation function may be applied to the output of a hash function (e.g., a National Institute of Standards and Technology key derivation function (NIST KDF), a keyed-hash message authentication code (HMAC) based key derivation function (HKDF), or a hash function of the primitive family Keccak (e.g., a SHA3 or SHAKE function)) applied to the message value msg and the random value s (e.g., applied to a combination of the message value msg and the random value s). The random value s may be obtained from a random number generator, retrieved from memory, or obtained in another manner. The error vector derivation function v(•) may be a one-way function that generates an n-bit error vector e (an n-dimensional vector of bits) using a pseudorandom function and a filter. In some implementations, for instance, the error vector derivation function applies a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to a combination of the message value and the random value, and applies a filter (e.g., a Fisher-Yates shuffle) to the output of the pseudorandom function to produce a set of t integers $(a_1, a_2, \ldots, a_n)$, where each integer is in the range $1 \le a_i \le n$ for $a_i \ne a_j$ for $i \ne j$. The set of t integers can then be used to generate the error vector e. For example, the error vector e may have a Hamming weight equal to t, where the $a_i$-th element of the error vector e is set to one (1) and the other elements of the error vector e are set to zero (0). The error vector derivation function may be implemented in another manner.

At 304, a plaintext value x is generated based on the message value msg, the random value s, and the error vector e. In some implementations, the plaintext value x is generated from the output of an exclusive-or (XOR) function. For example, an exclusive-or function may be applied to a string formed by the combination (e.g., concatenation) of the message value msg and the random value s and the output of a pseudorandom function applied to the error vector e, as in the example shown in FIG. 2. The pseudorandom function applied to the error vector e may be a cryptographic hash function (a hash function of the primitive family Keccak (e.g., a SHA3 or SHAKE function)), or a stream cipher (e.g., a Salsa20 or ChaCha function). In some instances, the output of the exclusive-or function includes a stringy that includes the plaintext value x and a second ciphertext component $C_2$, as described above with respect to FIG. 2. The plaintext value x may be generated in another manner.

At 306, the plaintext value x and the error vector e are used in an encryption function to produce a first ciphertext component $C_1$. The encryption function may use a public key to produce the first ciphertext component $C_1$ based on the plaintext value x and the error vector e. In some implementations, the encryption function is a McEliece encryption function, and the plaintext value x is encrypted according to a McEliece cryptosystem using the error vector e and a public key G. For example, the encryption function may be implemented according to a McEliece cryptosystem using a QC-MDPC code, and the first ciphertext component $C_1$ may be generated by adding the error vector e to the product of the plaintext value x and a public key matrix G ($C_1=xG+e$), as discussed above with respect to FIG. 2. The public key may be based on a private key known to a recipient node in some instances. For example, referring to the example shown in FIG. 2, the public key used in the encryption function 228 may be a public key matrix G based on a private key matrix H known to the node 204. The encryption function may be based on another cryptosystem, in some instances. For example, the encryption function may be based on a Niederreiter cryptosystem.

At 308, the first ciphertext component C is provided for transmission in a communication system. For example, the first ciphertext component $C_1$ are provided to an interface of the node or nodes performing the process 300 such that the node(s) may transmit the information to another node in the communication system. For instance, referring to the example shown in FIG. 2, the first ciphertext component 230 may be provided to a network interface of the node 202 for transmission to the node 204 over the channel 206. In some implementations, the second ciphertext component $C_2$ may also be provided for transmission in the communication system. The second ciphertext component $C_2$ may be provided for transmission in the same or separate transmission as the first ciphertext component $C_1$.

Figure 4:
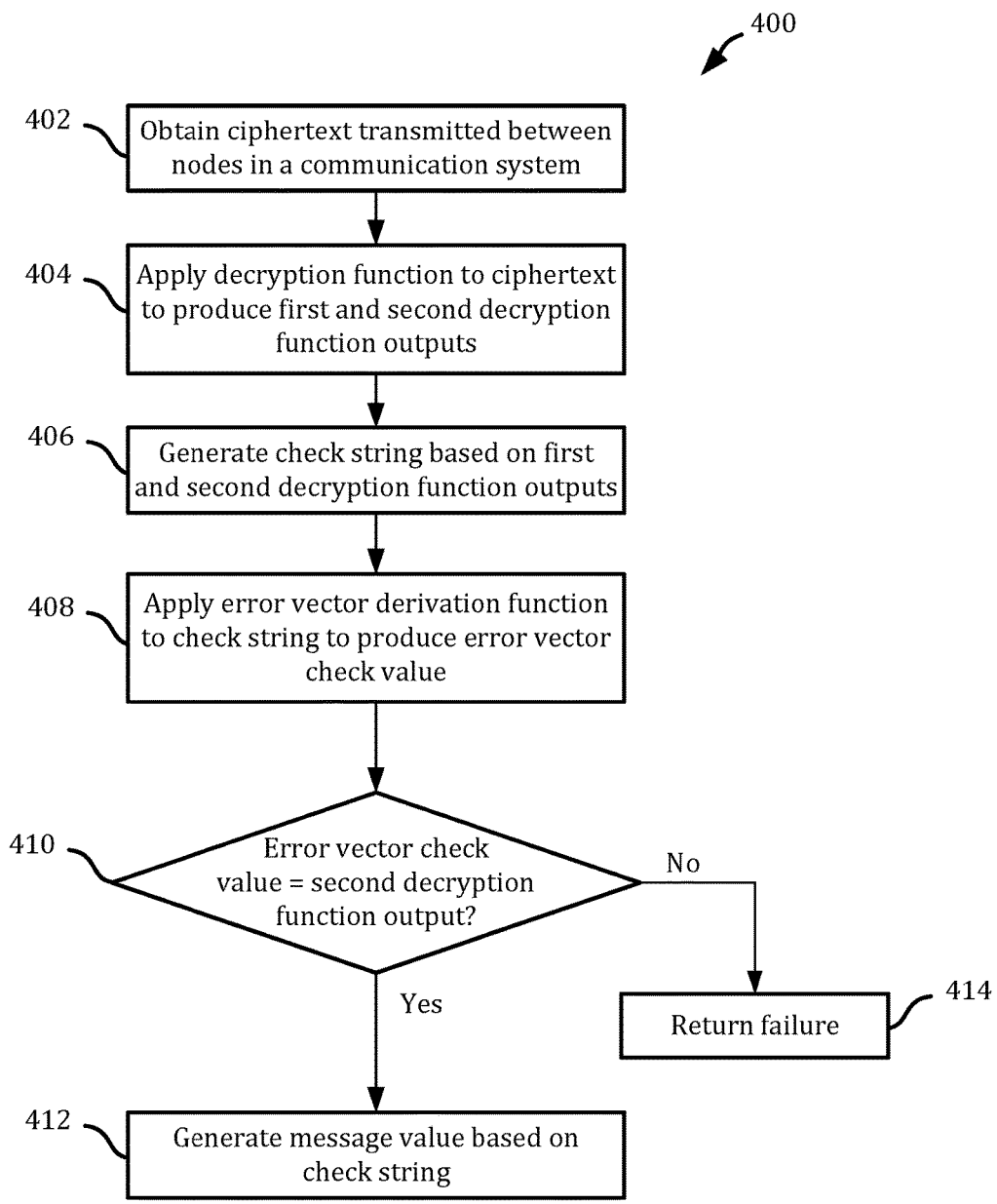
FIG. 4 is a flow diagram showing an example ciphertext decryption process.

FIG. 4 is a flow diagram showing an example ciphertext decryption process 400. The example process 400 can be performed, for example, by computer systems that can exchange information over a communication channel. For instance, operations in the process 400 may be performed by the nodes 102, 104 in the example communication system 100 shown in FIG. 1, the nodes 202, 204 in the example communication system 200 shown in FIG. 2 or in another type of system. The example process 400 may include additional or different operations, and the operations may be performed in the order shown or in another order. In some cases, one or more of the operations shown in FIG. 4 are implemented as processes that include multiple operations, sub-processes or other types of routines. In some cases, operations can be combined, performed in parallel, iterated or otherwise repeated or performed in another manner. In some examples, the process 400 is secure against quantum-enabled adversaries such as, for example, the quantum-enabled adversary 108 shown in FIG. 1. The example process 400 may also provide security against classically-enabled adversaries who do not have access to quantum computers or other quantum resources.

At 402, a first ciphertext component $C_1$ is obtained. The first ciphertext component may be a ciphertext transmitted between nodes in a communication system. For instance, referring to the example shown in FIG. 2, the first ciphertext component 230 is transmitted from node 202 to node 204 over the channel 206. The first ciphertext component may be obtained by receiving the first ciphertext component from an interface (e.g., network interface) after receipt of the first ciphertext component from another node, by retrieving the first ciphertext component stored in memory, or in another manner.

At 404, a decryption function is applied to the first ciphertext component $C_1$, and produces a first decryption function output x and a second decryption function output e. The decryption function may be the inverse of an encryption function used by another node in the communication network to generate the first ciphertext component $C_1$. Thus, the first and second decryption function outputs may include the plaintext value x and the error vector e, respectively, that are used in the encryption function to generate the first ciphertext component $C_1$. In some implementations, the decryption function is a McEliece decryption function, and the first ciphertext component $C_1$ is decrypted using a private key. For example, the decryption function may be implemented according to a McEliece cryptosystem using a QC-MDPC code, and the first ciphertext component $C_1$ may be decrypted using a private key matrix H, as discussed above with respect to FIG. 2. The decryption function may be based on another cryptosystem, in some instances. For example, the decryption function may be based on a Niederreiter cryptosystem.

At 406, a check string is generated based on the first and second decryption function outputs. In some implementations, the check string is generated by applying a pseudorandom function to the second decryption function output e, and applying an exclusive-or function to the output of the pseudorandom function and a value that includes the first decryption function output x. In some instances (e.g., where a second ciphertext component is transmitted with the first ciphertext component, as described above), the value includes the first decryption function output x and a second ciphertext component $C_2$. The pseudorandom function may be a National Institute of Standards and Technology key derivation function (NIST KDF), a keyed-hash message authentication code (HMAC) based key derivation function (HKDF), a hash function of the primitive family Keccak (e.g., a SHA3 or SHAKE function), a stream cipher (e.g., a Salsa20 or ChaCha function), or another type of pseudorandom function.

At 408, an error vector derivation function is applied to the check string to produce an error vector check value e'. The error vector derivation function may be a one-way function that generates an error vector check value e' of n-bits using a pseudorandom function and a filter. In some implementations, the error vector derivation function applies a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the check string, and then applies a filter (e.g., a Fisher-Yates shuffle) to the output of the pseudorandom function to produce a set of t integers $(a_1, a_2, \ldots, a_n)$, where each integer is in the range $1 \le a_i \le n$ for $a_i \ne a_j$ for $i \ne j$. The set of t integers can then be used to generate the error vector check value e'. For example, the error vector check value e' may have a Hamming weight equal to t, where the $a_i$-th element of the error vector check value e' is set to one (1) and the other elements of the error vector check value e' are set to zero (0).

At 410, the error vector check value e' and the second decryption function output e are compared. If the error vector check value e' is equal to the second decryption function output e, a message value is generated at 412 based on the check string. In some implementations, the message value is a portion of the check string. For example, the message may be the k most significant bits of the check string. The message value may be generated in another manner. If the error vector check value e' does not equal to the second decryption function output e, a failure is returned at 414. In some implementations, returning a failure includes delivering an error message, a return code, a flag, or another type of indicator. The indicator may be sent back to the node that transmitted the ciphertext, or to another node in a communication system. In some implementations, however, no indicator is sent and the indicator is kept only with the node performing the process 400.

Figure 5:
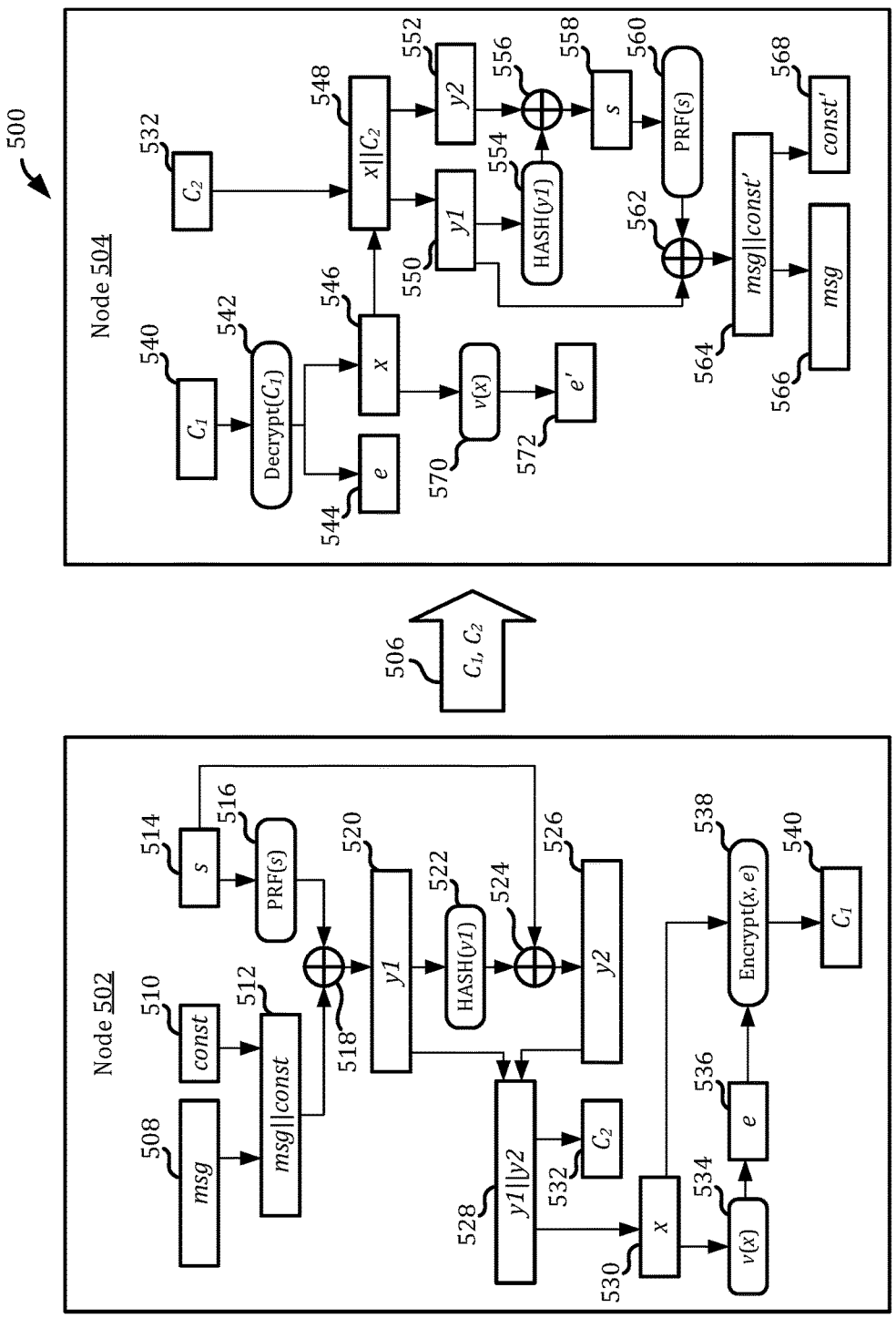
FIG. 5 is a block diagram showing aspects of another example conversion scheme for a public key cryptosystem.

FIG. 5 is a block diagram showing aspects of another example conversion scheme for a public key cryptosystem. In the example shown, a communication system 500 includes nodes 502 and 504 communicating over a channel 506. The nodes 502, 504 may be implemented similar to the nodes 102, 104 of FIG. 1. For instance, the nodes 502, 504 may each have computational resources (e.g., hardware, software, firmware) that are used to communicate with other nodes in the communication system 500, and may include a memory, processor, and interface as described above with respect to node 102 of FIG. 1. The nodes 502, 504 can be implemented in various systems, such as, for example, laptops, desktops, workstations, smartphones, tablets, personal digital assistants, servers, server clusters, mainframes, and other types of computer systems.

In the example shown in FIG. 5, the nodes 502, 504 exchange encrypted communications over the channel 506. The encrypted communications may be secure, in some instances, against both classical- and quantum-enabled adversaries (e.g., the quantum adversary 108 of FIG. 1). For instance, in some implementations, the node 502 uses a conversion scheme in a McEliece cryptosystem implemented using a Quasi-Cyclic Medium Density Parity Check (QC-MDPC) code $\mathcal{C}$ of (n, k, t), where n is the size of a code word, k is the size of a QC-MDPC plaintext, and t is the Hamming weight of an error vector. By using a conversion scheme, such as the one shown in FIG. 5, the communications exchanged over the channel 506 may be secure against the known key recovery attack as well as the Adaptive Chosen Ciphertext Attack (CCA2) more efficiently than other CCA2 conversion techniques (e.g., the Kobara-Imai CCA2 conversion technique).

In the example shown in FIG. 5, the node 502 obtains a message 508 (msg) and a constant value 510 (const). The message 508 may be generated by the node 502 (e.g., by a user of the node 502 using a messaging application), may be obtained from another node in the communication system 500, or may be obtained in another manner. The constant value 510 may be any constant value that is known to both nodes 502, 504. In some instances, for example, the constant value may be a known parameter of the conversion scheme. In the example shown, the constant value 510 has a length of h bits. The node 502 also obtains a random value 514 (s). The random value 514 may be generated using a random number generator or in another manner. In the example shown, the random value 514 has a length of h-bits and the message 508 has a length of l-bits (with l≥k−h, where k denotes the length of a plaintext value (described below)).

The node 502 concatenates the message 508 and the constant value 510 to produce the concatenated string 512, and also applies a pseudorandom function 516 to the random value 514. The pseudorandom function 516 may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), a stream cipher (e.g., a Salsa20 or ChaCha function), or another type of pseudorandom function. The node 502 then applies an exclusive-or (XOR) function 518 to the string 512 and the output of the pseudorandom function 516 to produce a first string 520 (y1). A cryptographic hash function 522 is applied to the first string 520, and an exclusive-or (XOR) function 524 is applied to the output of the hash function 522 and the random value 514 to produce a second string 516 (y2). The cryptographic hash function 522 may include a hash function of the primitive family Keccak (e.g., a SHA3 or SHAKE function) or another type of cryptographic hash function.

The first string 520 and second string 526 are concatenated to produce the concatenated string 528 (y1∥y2), which includes a k-bit plaintext value 530 (x) and an h-bit second ciphertext component 532 ($C_2$). In the example shown, the plaintext value 530 (x) is the k most significant bits of the concatenated string 528, and the second ciphertext component 532 is the remaining portion of the concatenated string 528. In some instances (e.g., where the message 508 is of length k), the concatenated string 528 does not include the second ciphertext component 532.

The node 502 then applies an error vector derivation function 534 (v(•)) to the plaintext value 530 to produce an error vector 536 (e). In the example shown, the error vector derivation function 534 is a one-way (non-invertible) function that generates the error vector 536 in a pseudorandom manner. The error vector 536 has a length of n-bits. In some instances, the error vector derivation function 534 may apply a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the plaintext value 530 and apply a filter (e.g., a Fisher-Yates shuffle) to the pseudorandom function output to produce a set of t integers $(a_1, a_2, \ldots, a_n)$, where each integer is in the range $1 \le a_i \le n$ for $a_i \ne a_j$ for $i \ne j$. The set of t integers can then be used to generate the error vector 536. For example, the error vector 536 may have a Hamming weight equal to t, where the $a_i$-th element of the error vector is set to one (1) and the other elements of the error vector are set to zero (0).

The plaintext value 530 and error vector 536 are then used as inputs to an encryption function 538, which produces a first ciphertext component 540 ($C_1$). In the example shown, the first ciphertext component 540 has a length of n-bits. In some implementations, the encryption function 538 is a McEliece encryption function implemented according to a McEliece cryptosystem using the QC-MDPC code. For instance, the QC-MDPC code may generate a public key G and private key H, where G is a k×n code generator matrix and H is a (n−k)×n parity check matrix for G. In some implementations, the private key matrix H may be computed first, and the public key matrix G may be derived from H. The encryption function 538 may use the public key matrix G to generate the first ciphertext component 540, for example, according to the equation $C_1 = xG + e$, where $C_1$ is the first ciphertext component 540, x is the plaintext 530, G is the public key matrix for the McEliece cryptosystem, and e is the error vector 536. The node 502 then transmits the first ciphertext component 540 and the second ciphertext component 532 to the node 504 over the channel 506.

In the example shown in FIG. 5, after receiving the first ciphertext component 540 and the second ciphertext component 532, the node 504 applies a decryption function 542 to the first ciphertext component 540. The decryption function 542 may be the inverse of the encryption function 538. In some implementations, the decryption function 542 is a McEliece decryption function implemented according to a McEliece cryptosystem using the QC-MDPC code. For instance, the private key matrix H discussed above may be used to decrypt the first ciphertext component 540, for example, by applying a QC-MDPC decoding algorithm equipped with knowledge of H. The decryption function 542 produces a first decryption function output 546 (x) with a length of k-bits and a second decryption function output 544 (e) with a length of n-bits. The node 504 then concatenates the first decryption function output 546 and the second ciphertext component 532 to produce the concatenated string 548, which includes the values 550, 552. In the example shown, the second value 552 is the k least significant bits of the concatenated string 548 and the first value 550 is the remaining most significant bits of the concatenated string 548.

The node 504 applies a cryptographic hash function 554 to the first value 550, and applies an exclusive-or (XOR) function 556 to the output of the cryptographic hash function 554 and the second value 552 to produce a third value 558 (s). The cryptographic hash function 554 may include a hash function of the primitive family Keccak (e.g., a SHA3 or SHAKE function) or another type of cryptographic hash function. The node 504 then applies a pseudorandom function 560 to the third value 558, and applies an exclusive-or (XOR) function 562 to the output of the pseudorandom function 560 and the first value 550 to produce a check string 564 (msg∥const') having a length of (l+h) bits. The pseudorandom function 560 may include a National Institute of Standards and Technology key derivation function (NIST KDF), a keyed-hash message authentication code (HMAC) based key derivation function (HKDF), a hash function of the primitive family Keccak (e.g., a SHA3 or SHAKE function), a stream cipher (e.g., a Salsa20 or ChaCha function), or another type of pseudorandom function.

The node 504 also applies an error vector derivation function 570 (v(•)) to the first decryption function output 546 to produce an error vector check value 572 (e'). In the example shown, the error vector derivation function 570 is the same as error vector derivation function 534. The node 504 compares the error vector check value 572 with the second decryption function output 544. If the error vector check value 572 is equal to the second decryption function output 544 (if e=e') and the constant check value 568 is equal to the constant value 510 (if const=const'), the node 504 generates the message 566 (msg) from the check string 564 and outputs the message 566 (e.g., for display to a user of the node 504). In the example shown, the message 566 is the k most significant bits of the check string 564, the constant check value 568 is the h least significant bits of the check string 564. If, however, the error vector check value 572 is not equal to the second decryption function output 544 (if e≠e') or the constant check value 568 is not equal to the constant value 510 (if const≠const'), the node 504 returns a failure. In some implementations, returning a failure includes delivering an error message, a return code, a flag, or another type of indicator. The indicator may be sent back to the node 502, or to another node in a communication system. In some implementations, however, no indicator is sent and the indicator is kept only with the node 504.

Figure 6:
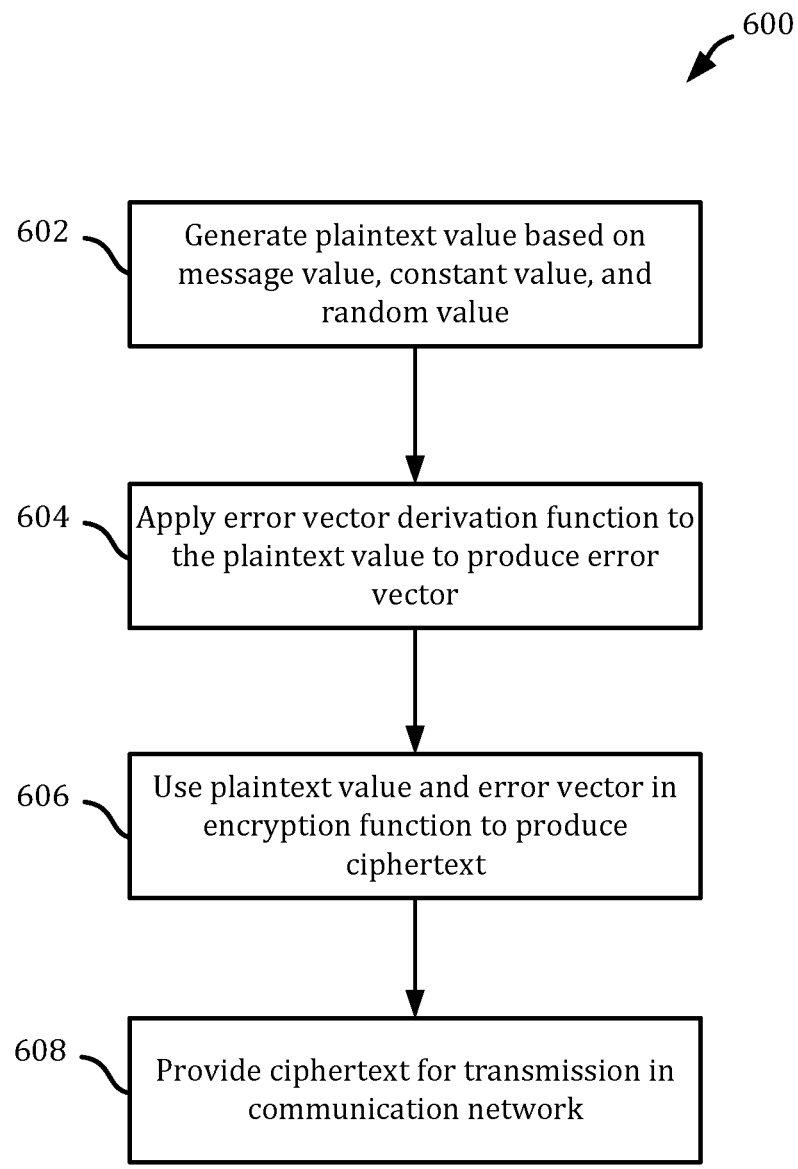
FIG. 6 is a flow diagram showing another example ciphertext generation process.

FIG. 6 is a flow diagram showing another example ciphertext generation process 600. The example process 600 can be performed, for example, by computer systems that can exchange information over a communication channel. For instance, operations in the process 600 may be performed by the nodes 102, 104 in the example communication system 100 shown in FIG. 1, the nodes 502, 504 in the example communication system 500 shown in FIG. 5 or in another type of system. The example process 600 may include additional or different operations, and the operations may be performed in the order shown or in another order. In some cases, one or more of the operations shown in FIG. 6 are implemented as processes that include multiple operations, sub-processes or other types of routines. In some cases, operations can be combined, performed in parallel, iterated or otherwise repeated or performed in another manner. In some examples, the process 600 is secure against quantum-enabled adversaries such as, for example, the quantum-enabled adversary 108 shown in FIG. 1. The example process 600 may also provide security against classically-enabled adversaries who do not have access to quantum computers or other quantum resources.

At 602, a plaintext value x is generated based on a message value msg, a constant value const, and a random value s. In some implementations, the plaintext value is generated by applying a pseudorandom function to the random value, and applying a first exclusive-or (XOR) function to an output of the pseudorandom function and a combination (e.g., concatenation) of the message value and the constant value. A cryptographic hash function may be applied to the output of the first exclusive-or function, and a second exclusive-or (XOR) function may be applied to the random value and an output of the cryptographic hash function. The outputs of the first and second exclusive-or (XOR) functions (y1 and y2, respectively) may then be combined (e.g., concatenated), and the plaintext value may be generated based on the combination. For example, the plaintext value x may be the k most significant bits of the combination. In some instances, a second ciphertext component $C_2$ may also be generated from the combination. For example, the second ciphertext component $C_2$ may be the h least significant bits of the combination. The plaintext value x may be generated in another manner.

At 604, an error vector derivation function is applied to the plaintext value x to produce an error vector e. The error vector derivation function v(•) may be a one-way function that generates an n-bit error vector e (an n-dimensional vector of bits) using a pseudorandom function and a filter. In some implementations, for instance, the error vector derivation function applies a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the plaintext value x, and applies a filter (e.g., a Fisher-Yates shuffle) to the output of the pseudorandom function to produce a set of t integers ($a_1$, $a_2$, ..., $a_n$), where each integer is in the range $1 \leq a_i \leq n$ for $a_i \neq a_j$ for $i \neq j$. The set of t integers can then be used to generate the error vector e. For example, the error vector e may have a Hamming weight equal to t, where the $a_i$-th element of the error vector e is set to one (1) and the other elements of the error vector e are set to zero (0). The error vector derivation function may be implemented in another manner.

At 606, the plaintext value x and the error vector e are used in an encryption function to produce a first ciphertext component $C_1$. The encryption function may use a public key to produce the first ciphertext component $C_1$ based on the plaintext value x and the error vector e. In some implementations, the encryption function is a McEliece encryption function, and the plaintext value x is encrypted according to a McEliece cryptosystem using the error vector e and a public key G. For example, the encryption function may be implemented according to a McEliece cryptosystem using a QC-MDPC code, and the first ciphertext component $C_1$ may be generated by adding the error vector e to the product of the plaintext value x and a public key matrix G ($C_1$=xG+e), as discussed above with respect to FIG. 5. The public key may be based on a private key known to a recipient node in some instances. For example, referring to the example shown in FIG. 5, the public key used in the encryption function 538 may be a public key matrix G based on a private key matrix H known to the node 504. The encryption function may be based on another cryptosystem, in some instances. For example, the encryption function may be based on a Niederreiter cryptosystem.

At 608, the first ciphertext component $C_1$ is provided for transmission in a communication system. For example, the first ciphertext component $C_1$ may be provided to an interface of the node or nodes performing the process 600 such that the node(s) may transmit the first ciphertext component $C_1$ to another node in the communication system. For instance, referring to the example shown in FIG. 5, the first ciphertext component 540 may be provided to a network interface of the node 502 for transmission to the node 504 over the channel 506. In some implementations, the second ciphertext component $C_2$ may also be provided for transmission in the communication system. A second ciphertext component $C_2$ may be provided for transmission in the same or separate transmission as the first ciphertext component $C_1$.

Figure 7:
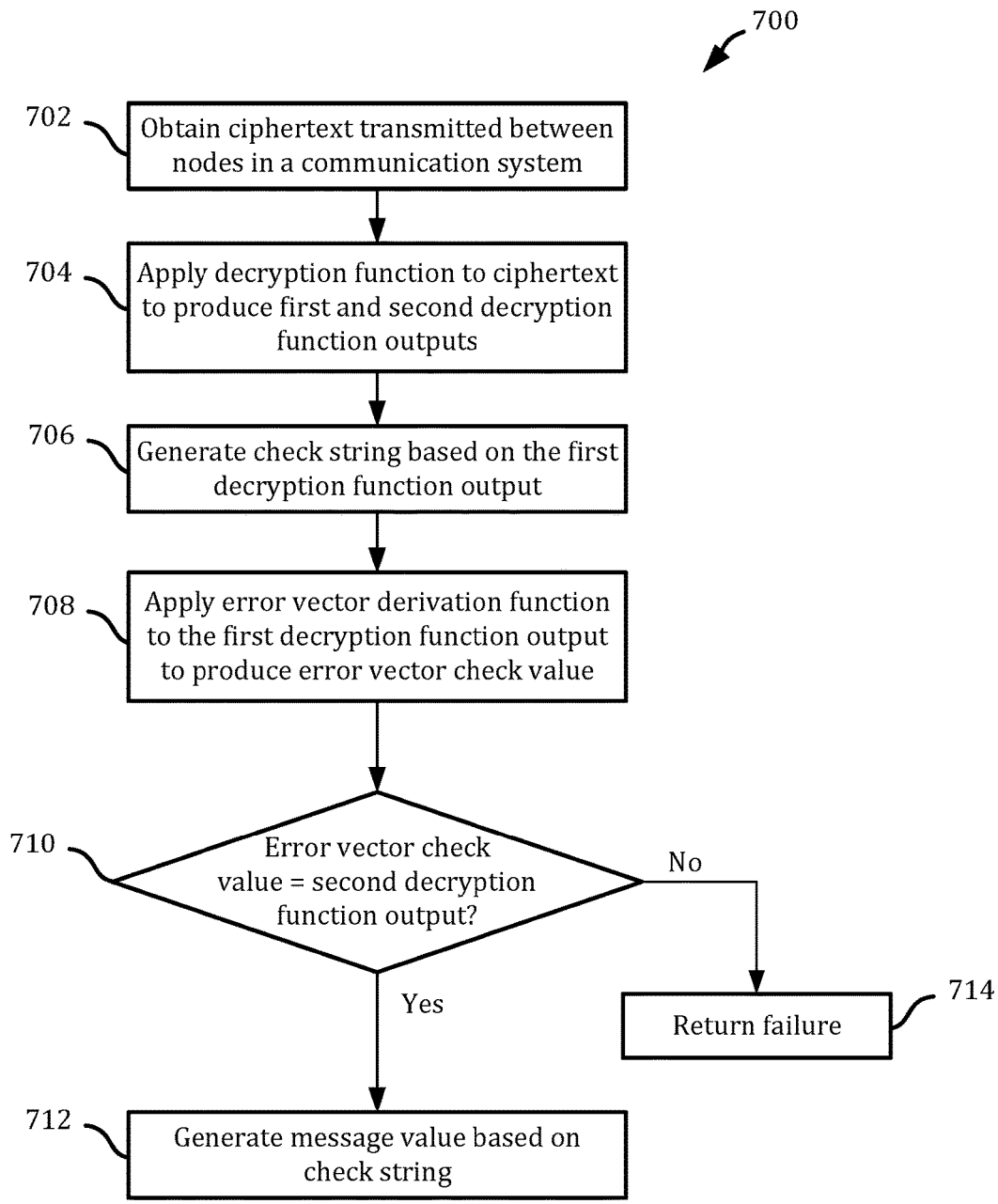
FIG. 7 is a flow diagram showing another example ciphertext decryption process.

FIG. 7 is a flow diagram showing another example ciphertext decryption process 700. The example process 700 can be performed, for example, by computer systems that can exchange information over a communication channel. For instance, operations in the process 700 may be performed by the nodes 102, 104 in the example communication system 100 shown in FIG. 1, the nodes 502, 504 in the example communication system 500 shown in FIG. 5 or in another type of system. The example process 700 may include additional or different operations, and the operations may be performed in the order shown or in another order. In some cases, one or more of the operations shown in FIG. 7 are implemented as processes that include multiple operations, sub-processes or other types of routines. In some cases, operations can be combined, performed in parallel, iterated or otherwise repeated or performed in another manner. In some examples, the process 700 is secure against quantum-enabled adversaries such as, for example, the quantum-enabled adversary 108 shown in FIG. 1. The example process 700 may also provide security against classically-enabled adversaries who do not have access to quantum computers or other quantum resources.

At 702, a first ciphertext component $C_1$ is obtained. The first ciphertext component may be a first ciphertext component transmitted between nodes in a communication system. For instance, referring to the example shown in FIG. 5, the first ciphertext component 540 is transmitted from node 502 to node 504 over the channel 506. The first ciphertext component may be obtained by receiving the first ciphertext component from an interface (e.g., network interface) after receipt of the first ciphertext component from another node, by retrieving the first ciphertext component stored in memory, or in another manner. In some implementations, the constant value const used to generate the first ciphertext component $C_1$ is also obtained. In some cases, the constant value is a value known to all nodes participating in cryptographic communications according to the processes 600, 700. The constant value may be obtained in another manner. In some implementations, a second ciphertext component $C_2$ is also obtained. In some instance, the second ciphertext component is obtained in the same transmission as the first ciphertext component $C_1$. The second ciphertext component may be obtained in another manner.

At 704, a decryption function is applied to the first ciphertext component $C_1$ to produce a first decryption function output x and a second decryption function output e. The decryption function may be the inverse of an encryption function used by another node in the communication network to generate the first ciphertext component $C_1$. Thus, the first and second decryption function outputs may include the plaintext value x and the error vector e, respectively, that are used in the encryption function to generate the first ciphertext component $C_1$. In some implementations, the decryption function is a McEliece decryption function, and the first ciphertext component $C_1$ is decrypted using a private key. For example, the decryption function may be implemented according to a McEliece cryptosystem using a QC-MDPC code, and the first ciphertext component $C_1$ may be decrypted using a private key matrix H, as discussed above with respect to FIG. 5. The decryption function may be based on another cryptosystem, in some instances. For example, the decryption function may be based on a Niederreiter cryptosystem.

At 706, a check string is generated based on the first decryption function output x. In some implementations, the check string is generated by generating a first value y1 and a second value y2 based on the plaintext value x, generating a third values based on the first and second values, and applying a first exclusive-or function to the first value (y1) and an output of a pseudorandom function applied to the third value to produce the check string. The pseudorandom function may be a National Institute of Standards and Technology key derivation function (NIST KDF), a keyed-hash message authentication code (HMAC) based key derivation function (HKDF), a hash function of the primitive family Keccak (e.g., a SHA3 or SHAKE function), a stream cipher (e.g., a Salsa20 or ChaCha function), or another type of pseudorandom function. The third value s may be generated by applying a cryptographic hash function to the first value y1 and applying a second exclusive-or function to the second value y2 and an output of the cryptographic hash function. The cryptographic hash function may be a hash function of the primitive family Keccak (e.g., a SHA3 or SHAKE function) or another type of cryptographic hash function. Where a second ciphertext component $C_2$ is obtained at 702, the second ciphertext component may be combined (e.g., concatenated) with the plaintext value x, with the first and second values y1 and y2 being generated by parsing the combination.

At 708, an error vector derivation function is applied to the first decryption function output x to produce an error vector check value e'. The error vector derivation function may be a one-way function that generates an error vector check value e' of n-bits using a pseudorandom function and a filter. In some implementations, the error vector derivation function applies a pseudorandom function (e.g., a National Institute of Standards and Technology key derivation function (NIST KDF), a keyed-hash message authentication code (HMAC) based key derivation function (HKDF), a hash function of the primitive family Keccak (e.g., a SHA3 or SHAKE function), or a stream cipher (e.g., a Salsa20 or ChaCha function)) to the first decryption function output x, and then applies a filter (e.g., a Fisher-Yates shuffle) to the output of the pseudorandom function to produce a set oft integers $(a_1, a_2, \ldots, a_n)$, where each integer is in the range $1 \le a_i \le n$ for $a_i \ne a_j$ for $i \ne j$. The set of t integers can then be used to generate the error vector check value e'. For example, the error vector check value e' may have a Hamming weight equal to t, where the $a_i$-th element of the error vector check value e' is set to one (1) and the other elements of the error vector check value e' are set to zero (0).

At 710, the error vector check value e' and the second decryption function output e are compared. If the error vector check value e' is equal to the second decryption function output e, a message value msg is generated at 712 based on the check string. In some implementations, the message value is a portion of the check string. For example, the message value msg may be the k most significant bits of the check string. The message value may be generated in another manner. If the error vector check value e' does not equal to the second decryption function output e, a failure is returned at 714. In some implementations, returning a failure includes delivering an error message, a return code, a flag, or another type of indicator. The indicator may be sent back to the node that transmitted the first ciphertext component, or to another node in a communication system. In some implementations, however, no indicator is sent and the indicator is kept only with the node performing the process 700.

In some implementations, where the constant value const used to generate the first ciphertext component $C_1$ is also obtained at 702, the constant value const may be compared, at 710, with a constant check value const' that is generated based on the check string. In some cases, for example, the constant check value const' is the h least significant bits of the check string. If the error vector check value e' is equal to the second decryption function output e and the constant check value const' is equal to the constant value const, then the message is generated based on the check string at 712. Otherwise, a failure is returned at 714.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by data processing apparatus on data stored in memory (e.g., on one or more computer-readable storage devices) or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. In some instances, the data processing apparatus includes a set of processors. The set of processors may be co-located (e.g., multiple processors in the same computing device) or located in different location from one another (e.g., multiple processors in distributed computing devices). The memory storing the data executed by the data processing apparatus may be co-located with the data processing apparatus (e.g., a computing device executing instructions stored in memory of the same computing device), or located in a different location from the data processing apparatus (e.g., a client device executing instructions stored on a server device).

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, a tablet computer, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a stylus, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. The communication network may include one or more of a local area network ("LAN") and a wide area network ("WAN"), an internetwork (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of the examples described here, a conversion scheme is used in a public key cryptosystem.

In a first example, an error vector derivation function $(v(\bullet))$ is applied to a random value (s) and a message value (msg) to produce an error vector (e). A plaintext value (x) is generated based on the random value (s), the message value (msg), and the error vector (e). The error vector (e) and the plaintext value (x) are used, by operation of one or more processors, in an encryption function to produce a first ciphertext component $(C_1)$, and the first ciphertext component $(C_1)$ is provided for transmission in a communication system.

Implementations of the first example may include one or more of the following features. Applying the error vector derivation function $(v(\bullet))$ to the random value (s) and the message value (msg) may include applying the error vector derivation function to a concatenation of the random value and the message value (msg||s). Applying the error vector derivation function $(v(\bullet))$ to the random value (s) and the message value (msg) may include applying the error vector derivation function to an output of a hash function applied to the random value and the message value. Applying the error vector derivation function $(v(\bullet))$ to the random value (s) and the message value (msg) may include applying a pseudorandom function to the random value (s) and the message value (msg) to produce a pseudorandom function output, applying a filter to the pseudorandom function output the produce a filtered pseudorandom function output $(a_1, a_2, \ldots, a_n)$, and generating the error vector (e) based on the filtered pseudorandom function output, the error vector (e) having a Hamming weight equal to t. The filtered pseudorandom function output may include t integers, and respective positions of the nonzero elements of the error vector (e) may be indicated by the filtered pseudorandom function output.

Implementations of the first example may include one or more of the following features. Generating the plaintext value (x) may include applying a pseudorandom function to the error vector (e) to produce a pseudorandom function output, and applying an exclusive-or (XOR) function to the pseudorandom function output and a combination of the random value and the message value (msg||s). The pseudorandom function may include a cryptographic hash function or a stream cipher. Generating the plaintext value (x) may include generating a string (y) that includes the plaintext value (x) and a second ciphertext component $(C_2)$. The second ciphertext component may be provided for transmission in the communication system.

Implementations of the first example may include one or more of the following features. The encryption function may include a McEliece encryption function. Using the error vector and the plaintext value in the encryption function may include adding the error vector to the product of the plaintext value and a public key matrix (c=xG+e).

In a second example, a first ciphertext component $(C_1)$ transmitted between nodes in a communication system is obtained. A decryption function is applied, by operation of one or more processors, to the first ciphertext component $(C_1)$ to produce a first decryption function output (x) and a second decryption function output (e). A check string (msg||s) is generated based on the first decryption function output (x) and the second decryption function output (e), and an error vector derivation function $(v(\bullet))$ is applied to the check string (msg||s) to produce an error vector check value (e'). The second decryption function output (e) is compared with the error vector check value (e'), and a message value (msg) is generated based on the check string in response to a determination that the second decryption function output (e) is equal to the error vector check value (e').

Implementations of the second example may include one or more of the following features. The decryption function may include a McEliece decryption function. Generating the check string (msg||s) may include applying a pseudorandom function to the second decryption function output (e) to produce a pseudorandom function output, and applying an exclusive-or (XOR) function to the pseudorandom function output and a value that includes the first decryption function output (x). Applying the error vector derivation function $(v(\bullet))$ to the check string (msg||s) may include applying a pseudorandom function to the check string (msg||s) to produce a pseudorandom function output, applying a filter to the pseudorandom function output the produce a filtered pseudorandom function output $(a_1, a_2, \ldots, a_n)$, and generating an error vector check value (e') based on the filtered pseudorandom function output, the error vector check value (e') having a Hamming weight equal to t. The filtered pseudorandom function output may include t integers; and respective positions of the nonzero elements of the error vector check value (e') may be indicated by the filtered pseudorandom function output.

In a third example, a plaintext value (x) is generated based on a message value (msg), a constant value (const), and a random value (s). An error vector derivation function $(v(\bullet))$ is applied to the plaintext value (x) to produce an error vector (e). The plaintext value (x) and the error vector (e) used, by operation of one or more processors, in an encryption function to produce a first ciphertext component $(C_1)$, and the first ciphertext component $(C_1)$ is provided for transmission in a communication network.

Implementations of the third example may include one or more of the following features. Generating the plaintext value may include applying a pseudorandom function to the random value, applying an exclusive-or function to an output of the pseudorandom function and a combination of the message value and the constant value, and generating the plaintext value based on an output of the exclusive-or function (y1). The exclusive-or function may be a first exclusive-or function, a cryptographic hash function may be applied to the output of the first exclusive-or function (y1), a second exclusive-or function may be applied to the random value and an output of the cryptographic hash function, and the plaintext value may be based on the output of the first exclusive-or function (y1) and the output of the second exclusive-or function (y2). Generating the plaintext value may include generating a string comprising the plaintext value and a second ciphertext component $(C_2)$, and the second ciphertext component may be provided for transmission in the communication system. Applying the error vector derivation function $(v(\bullet))$ to the plaintext value may include applying a pseudorandom function to the plaintext value to produce a pseudorandom function output, applying a filter to the pseudorandom function output the produce a filtered pseudorandom function output $(a_1, a_2, \ldots, a_n)$, the filtered pseudorandom function output comprising t integers; and generating the error vector (e) based on the filtered pseudorandom function output. The error vector (e) may have a Hamming weight equal to t, wherein respective positions of the nonzero elements of the error vector (e) are indicated by the filtered pseudorandom function output. The encryption function may include a McEliece encryption function, and applying the encryption function to the error vector and the plaintext value may include adding the error vector to the product of the plaintext value and a public key matrix (c=xG+e).

In a fourth example, a first ciphertext component $(C_1)$ transmitted between nodes in a communication system is obtained. A decryption function is applied to the first ciphertext component $(C_1)$ to produce a first decryption function output (x) and a second decryption function output (e). A check string (msg∥const') is generated based on the first decryption function output (x), and an error vector derivation function (v(•)) is applied to the first decryption function output (x) to produce an error vector check value (e'). The second decryption function output (e) is compared with the error vector check value (e'), and a message value (msg) is generated based on the check string in response to a determination that the second decryption function output (e) is equal to the error vector check value (e').

Implementations of the fourth example may include one or more of the following features. A constant value (const) used in generating the first ciphertext component may be obtained, a portion of the check string (const') may be compared with the constant value, and the message value may be generated in response to a determination that the constant value is equal to the portion of the check string. Generating the check string based on the first decryption function output may include generating a first value (y1) and a second value (y2) based on the plaintext value (x), generating a third value (s) based on the first and second values, and generating the check string by applying an exclusive-or function to the first value (y1) and an output of a pseudorandom function applied to the third value. The exclusive-or function may be a first exclusive-or function, and generating the third value based on the first and second values may include applying a cryptographic hash function to the first value (y1) and applying a second exclusive-or function to the second value (y2) and an output of the cryptographic hash function. A second ciphertext component $(C_2)$ transmitted between the nodes in the communication system may be obtained, and generating the first value (y1) and the second value (y2) based on the plaintext value (x) may include parsing a combination of the plaintext value (x) and the second ciphertext component $(C_2)$. The decryption function may include a McEliece decryption function, and applying the decryption function may include using a private key to decrypt the first ciphertext component according to a McEliece cryptosystem. Applying the error vector derivation function (v(•)) to the first decryption function output (x) may include applying a pseudorandom function to the first decryption function output (x) to produce a pseudorandom function output, applying a filter to the pseudorandom function output the produce a filtered pseudorandom function output $(a_1, a_2, \ldots, a_n)$, where the filtered pseudorandom function output includes t integers, and generating the error vector check value (e') based on the filtered pseudorandom function output. The error vector check value (e') may have a Hamming weight equal to t, and respective positions of the nonzero elements of the error vector check value (e') may be indicated by the filtered pseudorandom function output.

In some implementations, a computing system includes data processing apparatus and memory storing instructions that are operable when executed by the data processing apparatus to perform one or more operations of the first, second, third, or fourth example. In some implementations, a computer-readable medium stores instructions that are operable when executed by data processing apparatus to perform one or more operations of the first, second, third, or fourth example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. An encryption method for securing against key recovery attacks or adaptive chosen ciphertext attacks, comprising:

receiving a message value to be communicated to a recipient over a communication network;
  applying an error vector derivation function to a random value and a message value to produce an error vector, wherein applying the error vector derivation function to the random value and the message value comprises:
    applying a pseudorandom function to the random value and the message value to produce a pseudorandom function output,
    applying a filter to the pseudorandom function output to produce a filtered pseudorandom function output, the filtered pseudorandom function output comprising t integers, and
    generating the error vector based on the filtered pseudorandom function output, the error vector having a Hamming weight equal to t;
  generating a plaintext value based on the random value, the message value, and the error vector;
  performing an encryption function using one or more processors executing computer instructions to operate on the error vector and the plaintext value, the encryption function generating a first ciphertext component;
  providing the first ciphertext component to an interface for transmission in a communication system; and sending, by the interface, a transmission comprising the first ciphertext over the communication network to secure against key recovery attacks or adaptive chosen ciphertext attacks.

2. The method of claim 1, wherein applying the error vector derivation function to the random value and the message value comprises applying the error vector derivation function to a concatenation of the random value and the message value.

3. The method of claim 1, wherein applying the error vector derivation function to the random value and the message value comprises applying the error vector derivation function to an output of a hash function applied to the random value and the message value.

4. The method of claim 1, wherein respective positions of the nonzero elements of the error vector are indicated by the filtered pseudorandom function output.

5. The method of claim 1, wherein generating the plaintext value comprises:
applying a pseudorandom function to the error vector to produce a pseudorandom function output; and
applying an exclusive-or function to the pseudorandom function output and a combination of the random value and the message value.

6. The method of claim 5, wherein the pseudorandom function comprises a cryptographic hash function or a stream cipher.

7. The method of claim 1, wherein generating the plaintext value comprises generating a string comprising the plaintext value and a second ciphertext component, and the method comprises providing the second ciphertext component for transmission in the communication system.

8. The method of claim 1, wherein the encryption function comprises a McEliece encryption function.

9. The method of claim 1, wherein using the error vector and the plaintext value in the encryption function comprises adding the error vector to the product of the plaintext value and a public key matrix.

10. A computing system for securing against key recovery attacks or adaptive chosen ciphertext attacks, comprising:
data processing apparatus; and
memory device storing instructions that are operable when executed by the data processing apparatus to perform operations comprising:
receiving a message value to be communicated to a recipient over a communication network;
applying an error vector derivation function to a random value and the message value to produce an error vector, wherein applying the error vector derivation function to the random value and the message value comprises:
applying a pseudorandom function to the random value and the message value to produce a pseudorandom function output,
applying a filter to the pseudorandom function output to produce a filtered pseudorandom function output, the filtered pseudorandom function output comprising t integers, and
generating the error vector based on the filtered pseudorandom function output, the error vector having a Hamming weight equal to t;
generating a plaintext value based on the random value, the message value, and the error vector;
performing an encryption function using one or more processors executing the instructions to operate on the error vector and the plaintext value, the encryption function generating a first ciphertext component;
providing the first ciphertext component to an interface for transmission in a communication system; and
sending, by the interface, a transmission comprising the first ciphertext over the communication network to secure against key recovery attacks or adaptive chosen ciphertext attacks.

11. The computing system of claim 10, wherein applying the error vector derivation function to the random value and the message value comprises applying the error vector derivation function to a concatenation of the random value and the message value.

12. The computing system of claim 10, wherein applying the error vector derivation function to the random value and the message value comprises applying the error vector derivation function to an output of a hash function applied to the random value and the message value.

13. The computing system of claim 10, wherein respective positions of the nonzero elements of the error vector are indicated by the filtered pseudorandom function output.

14. The computing system of claim 10, wherein generating the plaintext value comprises:
applying a pseudorandom function to the error vector to produce a pseudorandom function output; and
applying an exclusive-or function to the pseudorandom function output and a concatenation of the random value and the message value.

15. The computing system of claim 14, wherein the pseudorandom function comprises a cryptographic hash function or a stream cipher.

16. The computing system of claim 10, wherein generating the plaintext value comprises generating a string comprising the plaintext value and a second ciphertext component, and the method comprises providing the second ciphertext component for transmission in the communication system.

17. The computing system of claim 10, wherein the encryption function comprises a McEliece encryption function.

18. The computing system of claim 10, wherein using the error vector and the plaintext value in the encryption function comprises adding the error vector to the product of the plaintext value and a public key matrix.

19. A decryption method for securing against key recovery attacks or adaptive chosen ciphertext attacks, comprising:
obtaining a first ciphertext component transmitted between nodes in a communication system;
by operation of one or more processors, applying a decryption function to the first ciphertext component to produce a first decryption function output and a second decryption function output;
generating a check string based on the first decryption function output and the second decryption function output;
applying an error vector derivation function to the check string to produce an error vector check value, wherein applying the error vector derivation function to the check string comprises:
applying a pseudorandom function to the check string to produce a pseudorandom function output,
applying a filter to the pseudorandom function output to produce a filtered pseudorandom function output, the filtered pseudorandom function output comprising t integers, and generating the error vector check value based on the filtered pseudorandom function output, the error vector check value having a Hamming weight equal to t;

comparing the second decryption function output with the error vector check value; and generating a message value based on the check string in response to a determination that the second decryption function output is equal to the error vector check value for securing against key recovery attacks or adaptive chosen ciphertext attacks.

20. The method of claim 19, wherein the decryption function comprises a McEliece decryption function.

21. The method of claim 19, wherein generating the check string comprises:

applying a pseudorandom function to the second decryption function output to produce a pseudorandom function output; and applying an exclusive-or function to the pseudorandom function output and a value comprising the first decryption function output.

22. The method of claim 19, wherein respective positions of the nonzero elements of the error vector check value are indicated by the filtered pseudorandom function output.

23. A computing system for securing against key recovery attacks or adaptive chosen ciphertext attacks, comprising:

data processing apparatus; and memory storing instructions that are operable when executed by the data processing apparatus to perform operations comprising:

obtaining a first ciphertext component transmitted between nodes in a communication system;

applying a decryption function to the first ciphertext component to produce a first decryption function output and a second decryption function output;

generating a check string based on the first decryption function output and the second decryption function output;

applying an error vector derivation function to the check string to produce an error vector check value, wherein applying the error vector derivation function to the check string comprises:

applying a pseudorandom function to the check string to produce a pseudorandom function output;

applying a filter to the pseudorandom function output to produce a filtered pseudorandom function output, the filtered pseudorandom function output comprising t integers, and generating the error vector check value based on the filtered pseudorandom function output, the error vector check value having a Hamming weight equal to t;

comparing the second decryption function output with the error vector check value; and generating a message value based on the check string in response to a determination that the second decryption function output is equal to the error vector check value for securing against key recovery attacks or adaptive chosen ciphertext attacks.

24. The computing system of claim 23, wherein the decryption function comprises a McEliece decryption function.

25. The computing system of claim 23, wherein generating the check string comprises:

applying a pseudorandom function to the second decryption function output to produce a pseudorandom function output; and applying an exclusive-or function to the pseudorandom function output and a value comprising the first decryption function output.

26. The computing system of claim 23, wherein respective positions of the nonzero elements of the error vector check value are indicated by the filtered pseudorandom function output.

* * * * *